(12) United States Patent
Sakamoto et al.

(10) Patent No.: US 12,503,600 B2
(45) Date of Patent: Dec. 23, 2025

(54) THERMALLY CONDUCTIVE SILICONE POTTING COMPOSITION AND CURED PRODUCT THEREOF

(71) Applicant: SHIN-ETSU CHEMICAL CO., LTD., Tokyo (JP)

(72) Inventors: Akira Sakamoto, Annaka (JP); Toshiyuki Ozai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 805 days.

(21) Appl. No.: 17/774,641

(22) PCT Filed: Oct. 15, 2020

(86) PCT No.: PCT/JP2020/038855
§ 371 (c)(1),
(2) Date: May 5, 2022

(87) PCT Pub. No.: WO2021/090655
PCT Pub. Date: May 14, 2021

(65) Prior Publication Data
US 2023/0016906 A1    Jan. 19, 2023

(30) Foreign Application Priority Data
Nov. 6, 2019   (JP) ................. 2019-201608

(51) Int. Cl.
C08L 83/06    (2006.01)
H01L 23/373   (2006.01)

(52) U.S. Cl.
CPC ........... *C08L 83/06* (2013.01); *C08L 2201/08* (2013.01); *C08L 2203/206* (2013.01); *C08L 2205/025* (2013.01); *C08L 2205/03* (2013.01); *H01L 23/373* (2013.01)

(58) Field of Classification Search
CPC ............ C08L 83/06; C08L 2201/08; C08L 2203/206; C08L 2205/025; C08L 2205/03; H01L 23/373
USPC ...................................................... 523/220
See application file for complete search history.

(56) References Cited

U.S. PATENT DOCUMENTS 6,306,957 B1    10/2001  Nakano et al.
11,485,861 B2*  11/2022  Wei ........................ C08K 3/22

2016/0068732 A1    3/2016  Kitazawa
2019/0292321 A1*   9/2019  Appukuttan ............ C08K 3/38
2019/0292349 A1    9/2019  Ito
2020/0317979 A1   10/2020  Umetani

FOREIGN PATENT DOCUMENTS

| CN | 103834352 A | 6/2014 |
| JP | 3543663 B2 | 7/2004 |
| JP | 2011-122000 A | 6/2011 |
| JP | 2011-148958 A | 8/2011 |
| JP | 5304623 B2 | 10/2013 |
| JP | 2016-53140 A | 4/2016 |
| JP | 2019-77843 A | 5/2019 |
| JP | 2019-77845 A | 5/2019 |
| WO | WO 2019/150944 A1 | 8/2019 |

OTHER PUBLICATIONS

Chinese Office Action and Search Report for Chinese Application No. 202080076796.2, dated May 30, 2023.
International Search Report, issued in PCT/JP2020/038855, PCT/ISA/210, dated Dec. 22, 2020.
Written Opinion of the International Searching Authority, issued in PCT/JP2020/038855, PCT/ISA/210, dated Dec. 22, 2020.
Extended European Search Report for European Application No. 20884555.2, dated Nov. 10, 2023.

* cited by examiner

*Primary Examiner* — Robert S Jones, Jr.
*Assistant Examiner* — Elizabeth Amato
(74) *Attorney, Agent, or Firm* — Birch, Stewart, Kolasch & Birch, LLP

(57) ABSTRACT

A thermally conductive silicone potting composition that comprises, each in a preset amount,
(A) an organopolysiloxane having at least two alkenyl groups per molecule and having a viscosity of 0.01-100 Pa·s at 25° C.,
(B) an organopolysiloxane one end of which is blocked with an alkoxysilyl group, etc.,
(C) a crystalline silica having an average particle size of 0.1 μm or more and less than 5 μm,
(D) a crystalline silica having an average particle size of 5 μm or more and less than 100 μm,
(E) an organohydrogen siloxane having at least two SiH groups per molecule, and
(F) a hydrosilylation reaction catalyst, wherein the mass ratio of (C)/(D) is from 3/1 to 1/10.

5 Claims, No Drawings

THERMALLY CONDUCTIVE SILICONE POTTING COMPOSITION AND CURED PRODUCT THEREOF

TECHNICAL FIELD

This invention relates to a heat-conductive silicone potting composition and a cured product thereof.

BACKGROUND ART

Given the heightened awareness of global warming, in the automotive industry, eco-friendly vehicles such as hybrid vehicles, plug-in hybrid vehicles and electric vehicles are being developed with the aim of lowering greenhouse gases, and the inverters installed in such vehicles are being made smaller and higher performing so as to improve the fuel performance of the vehicle.

Along with this, components such as integrated circuits and reactors within the inverters are also being miniaturized and so the amount of heat generation is increasing. Such heat-generating components have hitherto been protected by placing a heat-conductive silicone composition such as a heat-conductive silicone grease composition, heat-conductive silicone gel composition or heat-conductive silicone potting composition between the heat-generating component and a cooler, thereby increasing the component cooling efficiency.

For example, Patent Document 1 discloses a heat-conductive silicone composition that includes an organopolysiloxane, a hydrolyzable group-containing methyl polysiloxane, a heat-conductive filler and a curing agent. However, having this composition adhere closely to a component having a fine structure is difficult.

To address this problem, Patent Document 2 discloses a technique which pre-assembles a cooler and a heat-generating component, casts therein a highly fluid heat-conductive silicone potting composition, and thus thermally connects the heat-generating component and the cooler.

However, with the method in Patent Document 2, in cases where a practical flowability is maintained, a thermal conductivity of about 1.0 W/m·K is the most that can be achieved, and so this approach cannot fully address the further increase in amount of heat generation that accompanies equipment miniaturization and component scaling nowadays.

Patent Documents 3 and 4, which relate to art for resolving this problem, disclose silicone potting compositions in which a large amount of heat-conductive filler is included, thus imparting a higher thermal conductivity, and which also have a high flowability.

However, a problem with these compositions is that, because they contain large amounts of alumina, the density is high and the total weight of the component ends up rising. Hence, in the enhancement of inverter performance, there exists a keen desire for a heat-conductive silicone potting composition that not only has a high thermal conductivity and a high flowability, but also has a low density.

PRIOR ART DOCUMENTS

Patent Documents

Patent Document 1: JP 3543663
Patent Document 2: JP 5304623
Patent Document 3: JP-A 2019-077843
Patent Document 4: JP-A 2019-077845

SUMMARY OF INVENTION

Technical Problem

The present invention was arrived at in light of the above circumstances. The object of the invention is to provide a heat-conductive silicone potting composition which, in spite of containing a large amount of heat-conductive filler, has a high flowability and can flow into minute spaces, and which, after curing, gives a cured product having the desired thermal conductivity and a low density.

Solution to Problem

As a result of intensive investigations aimed at achieving this object, the inventors have discovered a heat-conductive silicone potting composition which, with the joint use of crystalline silicas of differing average particle sizes as heat-conductive fillers, has a high flowability even when a large amount of heat-conductive filler is added and gives a cured product of low density. This discovery ultimately led to the present invention.

Accordingly, the invention provides the following.

1. A heat-conductive silicone potting composition which includes:
   (A) 100 parts by weight of an organopolysiloxane which has at least two alkenyl groups per molecule and lacks organoxysilyl groups, and which has a viscosity at 25° C. of from 0.01 to 100 Pa·s;
   (B) from 1 to 100 parts by weight of an organopolysiloxane of general formula (1) below

[Chem. 1]

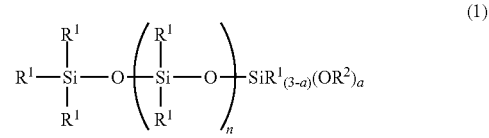

(wherein each $R^1$ is independently a substituted or unsubstituted monovalent hydrocarbon group; each $R^2$ is independently an alkyl group, alkoxyalkyl group, alkenyl group or acyl group; the subscript 'n' is an integer from 2 to 100; and the subscript 'a' is an integer from 1 to 3);
   (C) from 100 to 1,000 parts by weight of crystalline silica having an average particle size of at least 0.1 μm and less than 5 μm;
   (D) from 100 to 1,000 parts by weight of crystalline silica having an average particle size of at least 5 μm and up to 100 μm;
   (E) from 0.1 to 100 parts by weight of an organohydrogensiloxane having at least two SiH groups per molecule; and
   (F) a hydrosilylation catalyst,
wherein components (C) and (D) have a weight ratio therebetween, expressed as (C)/(D), which is from 3/1 to 1/10.

2. A cured product obtained by curing the heat-conductive silicone potting composition of 1 above.

3. The cured product of 2 above which has a thermal conductivity of at least 1.0 W/m·K and a density of not more than 2.2 g/cm³.

Advantageous Effects of Invention

Prior to curing, the heat-conductive silicone potting composition of the invention has a high flowability and can flow into minute spaces. After curing, the composition achieves the desired thermal conductivity and has a low density, enabling it to help protect components and reduce their weight. Hence, this invention is able to provide a heat-conductive silicone potting composition which is effective for potting in cases where a component having a fine structure such as a transformer is fixed to a cooler, and which, after curing in such a member, has a high thermal conductivity and can thus efficiently transfer the heat of the component to the cooler, and moreover has a low density, enabling the weight of the component to be reduced.

DESCRIPTION OF EMBODIMENTS

The invention is described below in greater detail.

The heat-conductive silicone potting composition of the invention is a composition which cures at room temperature or under heating and which bonds to metals, organic resins and the like. It includes:
(A) an alkenyl group-containing organopolysiloxane,
(B) an organopolysiloxane capped at one end with an alkoxysilyl group or the like,
(C) crystalline silica having an average particle size of at least 0.1 μm and less than 5 μm,
(D) crystalline silica having an average particle size of at least 5 μm and up to 100 μm,
(E) an organohydrogensiloxane, and
(F) a hydrosilylation catalyst.

[Component (A)]

Component (A) is an organopolysiloxane which has at least two silicon-bonded alkenyl groups per molecule and lacks organoxysilyl groups, and which has a viscosity at 25° C. of from 0.01 to 100 Pa·s, preferably from 0.06 to 10 Pa·s. When the viscosity at 25° C. is below 0.01 Pa·s, the composition has a poor shelf stability; when the viscosity is greater than 100 Pa·s, a high flowability cannot be assured. The viscosity is a value measured with a Brookfield-type rotational viscometer (the same applies below).

Such an organopolysiloxane is not particularly limited, so long as it satisfies the above viscosity and alkenyl group content. A known organopolysiloxane may be used, and the structure may be linear or may be branched. The organopolysiloxane may be a mixture of two or more organopolysiloxanes of differing viscosities.

Component (A) differs from component (B) in that it lacks organoxysilyl groups.

The silicon-bonded alkenyl groups, although not particularly limited, are preferably alkenyl groups of 2 to 10 carbon atoms, and more preferably alkenyl groups of 2 to 8 carbon atoms.

Specific examples include vinyl, allyl, 1-butenyl and 1-hexenyl groups. Of these, from the standpoints of ease of synthesis and cost, vinyl groups are preferred.

The number of alkenyl groups is preferably from 2 to 10. The alkenyl groups may be located at one or both ends of the molecular chain on the organopolysiloxane, or may be located partway along the molecular chain. However, from the standpoint of flexibility, they are preferably located only at both ends.

Organic groups other than the silicon-bonded alkenyl groups are not particularly limited so long as they satisfy the above conditions. Monovalent hydrocarbon groups of 1 to 20 carbon atoms are preferred, and monovalent hydrocarbon groups of 1 to 10 carbon atoms are more preferred.

Specific examples include alkyl groups such as methyl, ethyl, n-propyl, n-butyl, n-hexyl and n-dodecyl groups; aryl groups such as the phenyl group; and aralkyl groups such as 2-phenylethyl and 2-phenylpropyl groups.

Some or all hydrogen atoms on these hydrocarbon groups may be substituted with halogen atoms such as chlorine, fluorine or bromine. Specific examples include halogen-substituted monovalent hydrocarbon groups such as fluoromethyl, bromoethyl, chloromethyl and 3,3,3-trifluoropropyl groups.

Of these, alkyl groups of 1 to 5 carbon atoms are preferred. From the standpoints of ease of synthesis and cost, it is more preferable for at least 90 mol % to be methyl groups.

Therefore, component (A) is most preferably a dimethylpolysiloxane capped at both ends with dimethylvinylsilyl groups. Component (A) may be of one type used alone, or two or more types may be used together.

[Component (B)]

Component (B) is an organopolysiloxane of general formula (1) below that has the role of lowering the viscosity of the composition and imparting flowability. Component (B) is distinguished from component (A) in that it has a —SiOR² group at one end.

[Chem. 2]

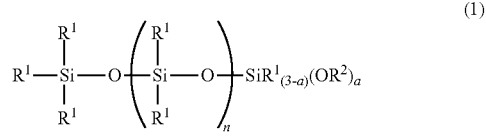

(1)

In the formula, each R¹ is independently a substituted or unsubstituted monovalent hydrocarbon group; each R² is independently an alkyl group, alkoxyalkyl group, alkenyl group or acyl group; the subscript 'n' is an integer from 2 to 100; and the subscript 'a' is an integer from 1 to 3.

The monovalent hydrocarbon group R¹, although not particularly limited, is preferably a monovalent hydrocarbon group of 1 to 10 carbon atoms, more preferably a monovalent hydrocarbon group of 1 to 6 carbon atoms, and even more preferably a monovalent hydrocarbon group of 1 to 3 carbon atoms.

Specific examples of the monovalent hydrocarbon group include alkyl groups, alkenyl groups, aryl groups, aralkyl groups, and halogenated alkyl groups and other halogenated monovalent hydrocarbon groups in which some or all of the hydrogen atoms on these monovalent hydrocarbon groups are substituted with halogen atoms such as chlorine, fluorine or bromine.

The alkyl groups may be linear, branched or cyclic. Specific examples include linear alkyl groups such as methyl, ethyl, n-propyl, n-hexyl and n-octyl groups; branched alkyl groups such as isopropyl, isobutyl, tert-butyl and 2-ethylhexyl groups; and cyclic alkyl groups such as cyclopentyl and cyclohexyl groups.

Specific examples of the alkenyl groups include vinyl, allyl, 1-butenyl and 1-hexenyl groups.

Specific examples of the aryl groups include phenyl and tolyl groups.

Specific examples of the aralkyl groups include 2-phenylethyl and is 2-methyl-2-phenylethyl groups.

Specific examples of the halogenated alkyl groups include 3,3,3-trifluoropropyl, 2-(nonafluorobutyl)ethyl and 2-(heptadecafluorooctyl)ethyl groups.

Of these, methyl, phenyl and vinyl groups are preferred as $R^1$.

The alkyl and alkenyl groups represented by $R^2$ are exemplified by the same groups as mentioned above for $R^1$. Examples of the alkoxyalkyl groups include methoxyethyl and methoxypropyl groups. Examples of the acyl groups include acetyl and octanoyl groups.

Of these, $R^2$ is preferably an alkyl group, and more preferably a methyl or ethyl groups.

The subscript 'n' is an integer from 2 to 100, and preferably an integer from 5 to 80.

The subscript 'a' is an integer from 1 to 3, and is preferably 3.

Component (B) has a viscosity at 25° C. which is preferably from 0.005 to 10 Pa·s, and more preferably from 0.005 to 1 Pa·s. Within such a range, a decrease in adhesive strength over time due to oil bleed from the composition can be suppressed and the viscosity is higher, enabling a decrease in flowability to be prevented.

Specific, non-limiting, examples of the organopolysiloxane of formula (1) include the following compounds.

[Chem. 3]

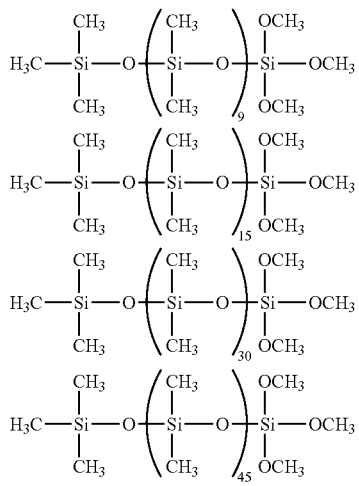

The content of component (B) per 100 parts by weight of component (A) is from 1 to 100 parts by weight, and preferably from 10 to 80 parts by weight. At less than 1 part by weight, a low-viscosity composition cannot be obtained; at more than 100 parts by weight, the physical properties after curing worsen.

Component (B) may be of one type used alone, or two or more types may be used together.

[Component (C)]

Component (C) is crystalline silica having an average particle size of at least 0.1 μm and less than 5 μm, and preferably from 1 to 4 μm, and has the role of imparting heat conductivity to the composition. At an average particle size below 0.1 μm, the particles readily agglomerate, resulting in poor flowability. The particles of component (C) are of any shape, and may be of an irregular shape or a spherical shape.

In this invention, the average particle size is the volume-based median diameter ($D_{50}$) in particle size distribution measurement by a laser light diffraction method.

The content of component (C) per 100 parts by weight of component (A) is from 100 to 1,000 parts by weight, preferably from 100 to 500 parts by weight, and more preferably from 100 to 300 parts by weight. At a component (C) content below 100 parts by weight, the desired thermal conductivity cannot be imparted to the cured product; at more than 1,000 parts by weight, the composition does not become liquid and has a poor flowability.

Component (C) may be of one type used alone, or two or more types may be used together.

[Component (D)]

Component (D) is crystalline silica having an average particle size of from 5 μm to 100 μm, and preferably from 10 to 30 μm, and has the role of imparting heat conductivity to the composition. At an average particle size greater than 100 μm, the flowability of the particles themselves may become low. The particles of component (C) are of any shape, and may be of an irregular shape or a spherical shape.

The content of component (D) per 100 parts by weight of component (A) is from 100 to 1,000 parts by weight, preferably from 200 to 800 parts by weight, and more preferably from 250 to 700 parts by weight. At a component (D) content below 100 parts by weight, the desired thermal conductivity cannot be imparted to the cured product; at more than 1,000 parts by weight, the composition does not become liquid and has a poor flowability.

Component (D) may be of one type used alone, or two or more types may be used together.

In this invention, by using components (C) and (D) together, the composition can be imparted with flowability while also conferring the desired heat conductivity.

The weight ratio between components (C) and (D), expressed as (C)/(D), is from 3/1 to 1/10, and preferably from 2/1 to 1/5. When the amount of component (C) is more than three times the amount of component (D), the viscosity of the composition rises, resulting in a poor flowability. Similarly, when the amount of component (C) is less than one-tenth the amount of component (D), the viscosity of the composition rises, resulting in a poor flowability.

[Component (E)]

Component (E) is an organohydrogensiloxane having at least 2, preferably 3 or more, and more preferably from 3 to 100, SiH groups on the molecule.

The organohydrogensiloxane serving as component (E) has a molecular structure that may be a linear, branched or network structure, and a plurality of organohydrogensiloxane chains may be bonded together by linkages. The silicon-bonded hydrogen atoms may be located only at terminal portions of the molecular chain (i.e., at one end or both ends) or only at non-terminal portions of the molecular chain, or may be located at both.

Organic groups other than the silicon-bonded hydrogen atoms in component (E) are exemplified by, exclusive of alkenyl groups, monovalent hydrocarbon groups having 1 to 10 carbon atoms. Examples include alkyl groups such as methyl, ethyl, propyl and butyl groups; aryl groups such as phenyl and tolyl groups; aralkyl groups such as phenylethyl and phenylpropyl groups; and halogenated alkyl groups in which some or all hydrogen atoms on the foregoing groups are substituted with halogen atoms such as chlorine, fluorine or bromine, specific examples of which include γ-chloropropyl and 3,3,3-trifluoropropyl groups.

Component (E) has a kinematic viscosity at 25° C. which, although not particularly limited, is preferably from 1 to 10,000 mm²/s, and more preferably from 1 to 1,000 mm²/s. This kinematic viscosity is a value measured at 25° C. with an Ostwald viscometer (the same applies below). Several types of component (E) having differing viscosities may be used together.

Alternatively, a cyclic organohydrogensiloxane of general formula (2) below may be used as component (E). This compound has the role of crosslinking components (A) and (B) and also has the role of imparting adhesiveness.

[Chem. 4]

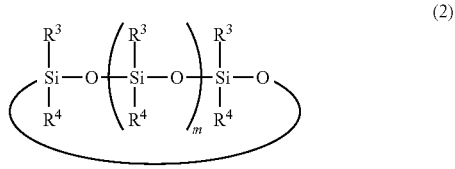

(2)

In the formula, each R³ is independently an alkyl group of 1 to 6 carbon atoms. Each R⁴ is independently a hydrogen atom, an epoxy, acryloyl, methacryloyl or trialkoxysilyl group bonded to a silicon atom through a carbon atom or a carbon atom and an oxygen atom, an ether bond-containing monovalent organic group or an aryl group-containing monovalent organic group, with the proviso that two or more of the groups represented by R⁴ are hydrogen atoms. The subscript 'm' is an integer from 2 to 10.

Examples of the alkyl group of 1 to 6 carbon atoms serving as R³ include methyl, ethyl, n-propyl, n-butyl, n-pentyl and n-hexyl groups. Of these, from the standpoint of ease of synthesis and cost, it is preferable for at least 90 mol % to be methyl groups.

As noted above, two or more of the groups represented by R⁴ are hydrogen atoms. When two or more of these groups are not hydrogen atoms, component (E) is unable to react with alkenyl groups on component (A), etc. to form a crosslinked structure.

Specific examples of groups other than hydrogen atoms in R⁴ include epoxy group-containing monovalent organic groups such as 3-glycidoxypropyl, 3-glycidoxypropylmethyl, 2-glycidoxyethyl and 3,4-epoxycyclohexylethyl groups; (meth)acryloyl group-containing monovalent organic groups such as methacryloxypropyl, methacryloxypropylmethyl, methacryloxyethyl, acryloxypropyl, acryloxypropylmethyl and acryloxyethyl groups; trialkoxysilyl group-containing monovalent organic groups such as trimethoxysilylpropyl, trimethoxysilylpropylmethyl, trimethoxysilylethyl, triethoxysilylpropyl, triethoxysilylpropylmethyl and triethoxysilylethyl groups; ether bond-containing monovalent organic groups such as oxyalkyl and alkyloxyalkyl groups; aryl group-containing monovalent organic groups such as phenyl, diphenyl and bisphenol A residues; and ether bond-containing halogen-substituted monovalent organic groups in which hydrogen atoms on the foregoing groups are substituted with halogen atoms such as fluorine atoms, such as perfluorooxyalkyl groups and perfluoroalkyloxyalkyl groups.

The subscript 'm' is an integer from 2 to 10, preferably an integer from 2 to 6, more preferably an integer from 2 to 4, and even more preferably 2.

Among the component (E) organohydrogensiloxanes of formula (2), organohydrogensiloxanes of formula (3) below are especially preferred.

[Chem. 5]

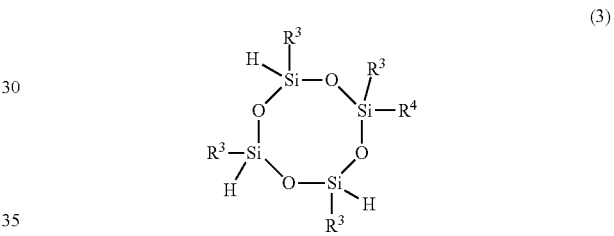

(3)

In the formula, R³ and R⁴ are as defined above.

Specific, non-limiting, examples of component (E) include organohydrogensiloxanes of the following formulas. Component (E) may be of one type used alone, or two or more types may be used together.

[Chem. 6]

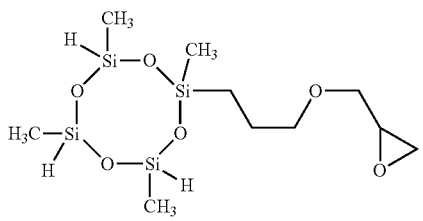

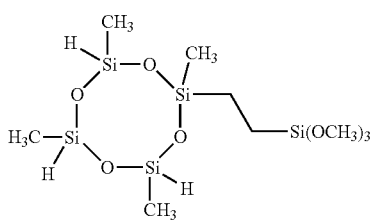

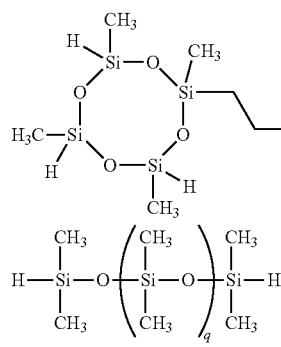
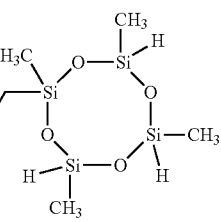

(wherein q is a number such that the viscosity falls in the above-indicated range.)

The component (E) content per 100 parts by weight of component (A) is from 0.1 to 100 parts by weight, and preferably from 10 to 30 parts by weight. At less than 0.1 part by weight, the hardness is inadequate; at more than 100 parts by weight, the physical properties after curing worsen.

[Component (F)]

Component (F) is a hydrosilylation catalyst. The hydrosilylation catalyst used may be one known to the art, provided that promotes addition reactions between alkenyl groups on component (A) or, as the case may be, components (A) and (B), and Si—H groups on component (E). Specifically, the use of a platinum family metal catalyst is preferred; of these, a catalyst selected from platinum and platinum compounds is especially preferred.

Specific examples of the catalyst include uncombined platinum family metals such as platinum (including platinum black), rhodium and palladium; $H_2PtCl_4 \cdot nH_2O$, $H_2PtCl_6 \cdot H_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, $Na_2HPtCl_4 \cdot nH_2O$ (wherein n in the formula is an integer from 0 to 6, and is preferably 0 or 6) and other platinum chlorides, chloroplatinic acids and chloroplatinic acid salts, alcohol-modified chloroplatinic acids, complexes of chloroplatinic acid and an olefin, platinum black, platinum family metals such as palladium supported on a support such as alumina, silica or carbon, rhodium-olefin complexes, chlorotris(triphenylphosphine)rhodium (Wilkinson's catalyst), and complexes of a platinum chloride, chloroplatinic acid or chloroplatinic acid salt with a vinyl group-containing siloxane. These may be of one type used alone, or two or more types may be used in combination.

The component (F) content is an amount that is effective as a catalyst. This should be an amount that enables the reaction between component (A) or, as the case may be, components (A) and (B), and component (E) to proceed, and may be suitably adjusted according to the desired cure rate.

In particular, the amount is one which, in terms of the weight of the platinum family metal atoms, corresponds to preferably from 0.1 to 17,000 ppm, and more preferably from 1 to 6,000 ppm, based on the weight of component (A). At a component (F) content within this range, a more efficient catalytic action can be expected.

[Other Components]

Aside from above components (A) to (F), the heat-conductive silicone composition of the invention may also include known additives within ranges that do not detract from the object of the invention.

For example, a reaction regulator may be included for the purpose of suppressing the composition curing reactions at room temperature and thereby extending the shelf life and pot life.

A known reaction regulator may be used, provided it is one that is capable of suppressing the catalytic activity of component (F).

Specific examples include acetylene alcohol compounds such as 1-ethynyl-1-cyclohexanol and 3-butyn-1-ol, various nitrogen compounds such as triallyl isocyanurate, organophosphorus compounds, oxime compounds and organochlorine compounds. These may be of one type used alone or two or more may be used together. Of these, 1-ethynyl-1-cyclohexanol and triallyl isocyanurate are preferred.

When a reaction regulator is used, taking into consideration the shelf life and pot life of the composition and also the curability of the composition, the amount included per 100 parts by weight of component (A) is preferably from 0.01 to 5 parts by weight, and more preferably from 0.05 to 1 part by weight.

To improve dispersibility in the composition, the reaction regulator may be used after dilution with an organic solvent such as toluene, xylene or isopropyl alcohol.

An organopolysiloxane capped at both ends with trialkoxysilyl groups may be added for the purpose of lowering the viscosity of the heat-conductive silicone composition of the invention and thereby imparting flowability.

The organopolysiloxane capped at both ends with trialkoxysilyl groups has a viscosity at 25° C. that is preferably from 0.01 to 100 Pa·s, more preferably from 0.03 to 10 Pa·s, and even more preferably from 0.05 to 5 Pa·s.

The alkoxy groups that form the trialkoxysilyl groups at both ends are each independently ones having preferably from 1 to 6 carbon atoms, and more preferably 1 to 4 carbon atoms. Examples of the trialkoxysilyl groups include trimethoxysilyl and triethoxysilyl groups.

Substituents bonded to silicone atoms other than at both ends are exemplified by monovalent hydrocarbon groups of 1 to 8 carbon atoms, including alkyl groups such as methyl, ethyl, n-propyl, n-butyl, n-pentyl and n-hexyl groups, cycloalkyl groups such as the cyclohexyl group, alkenyl groups such as vinyl and allyl groups, and aryl groups such as phenyl and tolyl groups; and halogenated monovalent hydrocarbon groups in which some or all of the hydrogen atoms on the foregoing monovalent hydrocarbon groups are substituted with halogen atoms such as chlorine, fluorine or bromine, including chloromethyl and trifluoromethyl groups.

These organopolysiloxanes are exemplified by those of formula (4) below.

[Chem. 7]

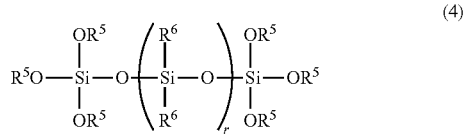

(4)

In formula (4), each $R^5$ is independently an alkyl group of 1 to 4 carbon atoms, specific examples of which include methyl, ethyl, n-propyl and n-butyl groups. Of these, methyl and ethyl groups are preferred.

Each $R^6$ is independently a substituted or unsubstituted monovalent hydrocarbon group of 1 to 8 carbon atoms. Specific examples include monovalent hydrocarbon groups, including alkyl groups such as methyl, ethyl, n-propyl, n-butyl, n-pentyl, n-hexyl and n-heptyl groups, and aryl groups such as phenyl and tolyl groups; and halogenated monovalent hydrocarbon groups in which some or all of the hydrogen atoms on the foregoing monovalent hydrocarbon groups are substituted with halogen atoms such as chlorine, fluorine or bromine, including chloromethyl, 3-chloropropyl and trifluoromethyl groups.

Also, the subscript 'r' is an integer from 1 to 100.

When an organopolysiloxane capped at both ends with trialkoxysilyl groups is used, the amount included per 100 parts by weight of component (A) is preferably from 1 to 50 parts by weight, and more preferably from 5 to 20 parts by weight.

Hindered phenol-type antioxidants, reinforcing and non-reinforcing fillers such as calcium carbonate, and colorants such as pigments and dyes may also be added.

[Method of Preparing Heat-Conductive Silicone Potting Composition]

The method of preparing the inventive heat-conductive silicone potting composition is not particularly limited and may be carried out in accordance with a method known to the art. For example, this may involve mixing together components (A) to (F) and other, optional, ingredients. The composition may be in the form of a one-part or two-part composition.

If it is a one-part composition, long-term storage by refrigeration or freezing is possible. If it is a two-part composition, long-term storage at room temperature is possible.

A one-part composition is obtained as follows. Components (A), (B), (C) and (D) are placed in a gate mixer (available under the trade name Planetary Mixer from Inoue Mfg., Inc.) and mixed them together under heating at 150° C. for one hour, then cooled. Next, component (F) and a reaction regulator are added and mixing is carried out at 25° C. for 30 minutes, after which component (E) is added and mixing is carried out to uniformity at 25° C. for 30 minutes.

A two-part composition may consist of any combination of the ingredients, provided only that the combination of components (A), (E) and (F) is not allowed to be present. For example, components (A), (B), (C) and (D) are placed in a gate mixer and mixed together under heating at 150° C. for one hour, then cooled. After this, component (F) is added and mixed at 25° C. for 30 minutes to give Part A. Next, components (A), (B), (C) and (D) are placed in a gate mixer and mixed together under heating at 150° C. for one hour, then cooled. A reaction regulator is then added and mixing is carried out at room temperature for 30 minutes, subsequent to which component (E) is added and mixing is carried out at 25° C. for 30 minutes to give Part B. In this way, a two-part composition consisting of Part A and Part B can be obtained.

The heat-conductive silicone potting composition of the invention has a viscosity at 25° C. which is preferably from 1 to 100 Pa·s, and more preferably from 5 to 50 Pa·s. When the viscosity at 25° C. is less than 1 Pa·s, the heat-conductive filler has a tendency to precipitate; at a viscosity greater than 100 Pa·s, the flowability may worsen.

The heat-conductive silicone potting composition of the invention has a flowability at 23° C., the measurement method for which is described in detail in the subsequent examples, which is preferably at least 100 mm. In cases where the silicone potting composition is cast into a place where a component having a fine structure, such as a transformer, is attached to a cooler, the flowability is preferably at least 120 mm. As for the upper limit in flowability, the higher the flowability the better, but because the limit of measurement depends on the length of the aluminum sheet, the upper limit of measurement here is 400 mm.

The curing conditions for the heat-conductive silicone potting composition of the invention are not particularly limited, and may be conditions similar to those for known silicone gels.

The heat-conductive silicone potting composition, after being cast, may be cured by heat from the heat-generating component or may be actively heat-cured. The heat curing conditions are preferably a temperature of between 60 and 180° C., and more preferably between 80 and 150° C., and a period of preferably from 0.1 to 3 hours, and more preferably from 0.5 to 2 hours.

The cured product has a thermal conductivity at 25° C. which is preferably at least 1.0 W/m·K, and more preferably at least 1.5 W/m·K. Although there is no particular upper limit, the thermal conductivity is generally 3.0 W/m·K or less.

The density of the cured product is preferably 2.2 g/cm³ or less, and more preferably 2.1 g/cm³ or less. Although there is no particular lower limit, the density is generally at least 1.7 g/cm³.

The hardness of the cured product, which is a measured value obtained with a type A durometer, is preferably at least 20, and more preferably at least 25. Although there is no particular upper limit, the hardness is generally 50 or less.

When the heat-conductive silicone potting composition of the invention is used as a filling material within a case that contains a small heat-generating component, because it has a high flowability, the composition flows into all corners of the fine structure. After curing, the composition adheres well to the heat-generating component and the like and, because it has a high thermal conductivity, heat from the heat-generating component is efficiently conducted to the case, enabling the reliability to be dramatically increased. In addition, because the composition has a low density, it is also able to contribute to a reduction in the weight of the overall component.

EXAMPLES

The invention is illustrated more fully below by way of Examples and Comparative Examples, although the invention is not limited by these Examples.

The ingredients used in the Examples and Comparative Examples are as follows.

Component (A)
  A-1: A dimethylpolysiloxane capped at both ends with dimethylvinylsilyl groups and having a viscosity at 25° C. of 0.06 Pa·s
  A-2: A dimethylpolysiloxane capped at both ends with dimethylvinylsilyl groups and having a viscosity at 25° C. of 0.4 Pa·s Component (B)
  B-1: An organopolysiloxane of the following formula (viscosity at 25° C., 0.03 Pa·s)

[Chem. 8]

$$H_3C-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{30}-\underset{\underset{OCH_3}{|}}{\overset{\overset{OCH_3}{|}}{Si}}-OCH_3$$

Component (C)
  C-1: A crystalline silica powder having an average particle size of 1 μm (product name: Crystalite 5×, from Tatsumori Ltd.)
  C-2: A crystalline silica powder having an average particle size of 4 μm (product name: Min-U-Sil 15 micron, from U.S. Silica)

Component (D)
  D-1: A crystalline silica powder having an average particle size of 13 μm (product name: Crystalite NX-7, from Tatsumori Ltd.)
  D-2: A crystalline silica powder having an average particle size of 26 μm (product name: Crystalite 5K, from Tatsumori Ltd.)

Component (E)
  E-1: An organohydrogensiloxane of the following formula (viscosity at 25° C., 10 mm²/s)

[Chem. 9]

E-2: An organohydrogensiloxane of the following formula (viscosity at 25° C., 800 mm²/s)

[Chem. 10]

E-3: An organohydrogensiloxane of the following formula (viscosity at 25° C., 18 mm²/s)

[Chem. 11]

$$H-\underset{\underset{CH_3}{|}}{\overset{\overset{CH_3}{|}}{Si}}-O-\left(\underset{\underset{CH_3}{|}}{\overset{\overset{CH_3}{|}}{Si}}-O\right)_{18}-\underset{\underset{CH_3}{|}}{\overset{\overset{CH_3}{|}}{Si}}-H$$

Component (F)
  F-1: A dimethylpolysiloxane solution of a platinum-divinyltetramethyldisiloxane complex (the complex being dissolved in the same dimethylpolysiloxane as above A-3; content in terms of platinum atoms, 1 wt %)

Other ingredients:
  G-1: 1-Ethynyl-1-cyclohexanol
  G-2: Triallyl isocyanurate
  H-1: An organopolysiloxane capped at both ends with trimethoxysilyl groups and having a viscosity at 25° C. of 1 Pas
  I-1: Alumina powder having an average particle size of 1 μm
  I-2: Alumina powder having an average particle size of 10 μm Examples 1 to 3, Comparative Examples 1 to 5

Silicone potting compositions were obtained by mixing together in the following manner components (A) to (F) and the other ingredients.

Components (A), (B), (C), (D) and (H-1) were added in the amounts shown in Table 1 to a 5-liter gate mixer (product name: 5 L Planetary Mixer, from Inoue, Ltd.) and mixed under heating at 150° C. for 2 hours. The mixture was cooled, following which component (F) was added and mixing was carried out at 25° C. for 30 minutes. Next, the reaction regulators (G-1) and (G-2) were added and mixing was carried out at 25° C. for 30 minutes. Last of all, component (E) was added and mixing was carried out at 25° C. for 30 minutes.

The following properties were measured for the resulting composition. The results are shown in Table 2.

[1] Viscosity
The viscosity at 25° C. of the heat-conductive silicone potting composition was measured using a Brookfield viscometer at 20 rpm.

[2] Flowability
The heat-conductive silicone potting composition was measured out in an amount of 0.60 cc and dripped onto an aluminum sheet (JIS H 4000: 2014; 25 mm (W)×400 mm (L)×0.5 mm (T)). After dripping, the aluminum sheet was immediately tilted to an angle of 28° and left to stand for one hour in a 23° C. (±2° C.) atmosphere. The length of the heat-conductive silicone potting composition after being left to stand was measured from one end of the flow to the other end.

[3] Thermal Conductivity

The thermal conductivity at 25° C. of the cured form of the heat-conductive silicone potting composition was measured using the TPA-501 hot disk-method thermophysical property analyzer from Kyoto Electronics Manufacturing Co., Ltd.

[4] Hardness

The heat-conductive silicone potting composition was press-cured at a thickness of 2.0 mm for 10 minutes at 120° C., and additionally heated for 50 minutes in a 120° C. oven. Three of the resulting silicone sheets were stacked together, and the hardness was measured with the type A durometer specified in JIS K 6253: 2012.

[5] Elongation at Break, Tensile Strength

The heat-conductive silicone potting composition was press-cured at a thickness of 2.0 mm for 10 minutes at 120° C., and additionally heated for 50 minutes in a 120° C. oven. The elongation at break and tensile strength of the resulting silicone sheet were measured in accordance with JIS K 6251: 2017.

[6] Density

The heat-conductive silicone potting composition was press-cured at a thickness of 2.0 mm for 10 minutes at 120° C., and additionally heated for 50 minutes in a 120° C. oven. The density of the resulting silicone sheet was measured in accordance with JIS K 6251: 2017.

[7] Tensile Shear Bond Strength

Adhesive test pieces were fabricated by sandwiching the heat-conductive silicone potting composition between 1.0 mm thick aluminum sheets (JIS H 4000: 2014) to a thickness of 2.0 mm and a bonding surface area of 25 mm×10 mm and heating the assembly in this state at 120° C. for 1 hour, thereby curing the silicone potting composition. The tensile shear bond strength of the resulting test piece was measured in accordance with JIS K 6850: 1999.

TABLE 1

| Content (pbw) | Example | | | Comparative Example | | | | |
|---|---|---|---|---|---|---|---|---|
| | 1 | 2 | 3 | 1 | 2 | 3 | 4 | 5 |
| A-1 | 100 | — | 100 | — | — | — | — | — |
| A-2 | — | 100 | — | 100 | 100 | 100 | 100 | 100 |
| B-1 | 45 | 45 | 45 | 45 | 45 | 20 | 45 | 45 |
| C-1 | 162 | 273 | 273 | — | — | — | 40 | 648 |
| C-2 | — | — | 273 | 820 | — | — | — | — |
| D-1 | 648 | 273 | — | — | — | — | — | — |
| D-2 | — | 273 | 273 | — | 820 | — | 780 | 162 |
| E-1 | 3 | 3 | 3 | 3 | 3 | 1.8 | 3 | 3 |
| E-2 | 1.5 | 1.5 | 1.5 | 1.5 | 1.5 | 0.5 | 1.5 | 1.5 |
| E-3 | 15 | 15 | 15 | 15 | 15 | — | 15 | 15 |
| F-1 | 0.3 | 0.3 | 0.3 | 0.3 | 0.3 | 0.3 | 0.3 | 0.3 |
| G-1 | 0.08 | 0.08 | 0.08 | 0.08 | 0.08 | 0.2 | 0.08 | 0.08 |
| G-2 | 1.3 | 1.3 | 1.3 | 1.3 | 1.3 | 0.4 | 1.3 | 1.3 |
| H-1 | 9 | 9 | 9 | 9 | 9 | 7 | 9 | 9 |
| I-1 | — | — | — | — | — | 164 | — | — |
| I-2 | — | — | — | — | — | 493 | — | — |
| C/D | 1/4 | 1/2 | 2/1 | — | — | — | 1/19.5 | 4/1 |

TABLE 2

| Evaluated properties | Example | | | Comparative Example | | | | |
|---|---|---|---|---|---|---|---|---|
| | 1 | 2 | 3 | 1 | 2 | 3 | 4 | 5 |
| Viscosity (Pa · s) | 9 | 30 | 12 | did not become grease-like | 200 | 10 | 30 | did not become grease-like |
| Flowability (mm) | 280 | 150 | 135 | | 15 | 200 | 50 | |
| Thermal conductivity (W/m · K) | 1.7 | 1.7 | 1.6 | | 1.6 | 1.6 | 1.5 | |
| Hardness (type A) | 33 | 42 | 26 | | 30 | 20 | 43 | |
| Elongation at break (%) | 27 | 43 | 32 | | 35 | 100 | 20 | |
| Tensile strength (MPa) | 0.5 | 0.7 | 0.4 | | 0.3 | 0.4 | 0.3 | |
| Density (g/cm$^3$) | 2.02 | 2.00 | 2.01 | | 2.00 | 2.62 | 1.99 | |
| Tensile shear bond strength (MPa) | 0.3 | 0.4 | 0.2 | | 0.2 | 0.3 | 0.2 | |

As shown in Table 2, prior to curing, the heat-conductive silicone potting compositions of Examples 1 to 3 had a good flowability and gave cured products which exhibited good physical properties and had a low density.

On the other hand, in cases where the composition lacked component (C) or component (D) (Comparative Examples 1 and 2), the composition had too high a viscosity and was thus unsuitable as a potting composition.

In Comparative Example 3, a conventional alumina powder was used instead of the crystalline silicas of components (C) and (D), as a result of which the density was higher than in the heat-conductive silicone potting compositions of the invention.

In Comparative Example 4, the Component (C) content was inadequate, resulting in a poor flowability. In Comparative Example 5, the weight ratio (C)/(D) between components (C) and (D) did not satisfy the conditions of this invention, as a result of which the composition had too high a viscosity and was thus unsuitable as a potting composition.

The invention claimed is:

1. A heat-conductive silicone potting composition comprising:
   (A) 100 parts by weight of an organopolysiloxane which has at least two alkenyl groups per molecule and lacks organoxysilyl groups, and which has a viscosity at 25° C. of from 0.01 to 100 Pa·s;
   (B) from 1 to 100 parts by weight of an organopolysiloxane of general formula (1) below

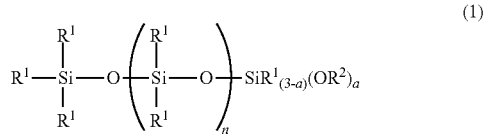

wherein each $R^1$ is independently a substituted or unsubstituted monovalent hydrocarbon group; each $R^2$ is independently an alkyl group, alkoxyalkyl group, alkenyl group or acyl group; the subscript 'n' is an integer from 2 to 100; and the subscript 'a' is an integer from 1 to 3;
   (C) from 100 to 546 parts by weight of crystalline silica having an average particle size of at least 0.1 μm and less than 5 μm;
   (D) from 100 to 546 parts by weight of crystalline silica having an average particle size of at least 5 μm and up to 100 μm;
   (E) from 0.1 to 100 parts by weight of an organohydrogensiloxane having at least two SiH groups per molecule; and
   (F) a hydrosilylation catalyst, wherein components (C) and (D) have a weight ratio therebetween, expressed as (C)/(D), which is from 3/1 to 1/10.

2. A cured product obtained by curing the heat-conductive silicone potting composition of claim 1.

3. The cured product of claim 2 which has a thermal conductivity of at least 1.0 W/m·K and a density of not more than 2.2 g/cm³.

4. The heat-conductive silicone potting composition of claim 1, wherein component (E) contains a cyclic organohydrogensiloxane of general formula (2) below

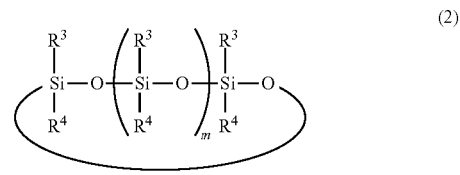

wherein each $R^3$ is independently an alkyl group of 1 to 6 carbon atoms, each $R^4$ is independently a hydrogen atom, an epoxy, acryloyl, methacryloyl or trialkoxysilyl group bonded to a silicon atom through a carbon atom or a carbon atom and an oxygen atom, an ether bond-containing monovalent organic group or an aryl group-containing monovalent organic group, with the proviso that two or more of the groups represented by $R^4$ are hydrogen atoms, 'm' is an integer from 2 to 10.

5. The heat-conductive silicone potting composition of claim 1, wherein component (E) contains one or more types of cyclic organohydrogensiloxanes selected from among compounds having the following formulas (i) to (iii) and one or more types of linear organohydrogensiloxanes selected from among compounds having the following formula (iv)

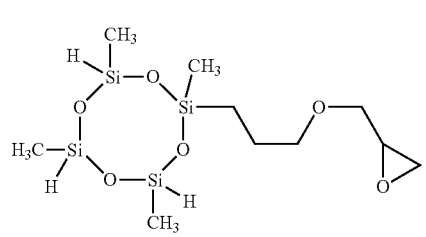

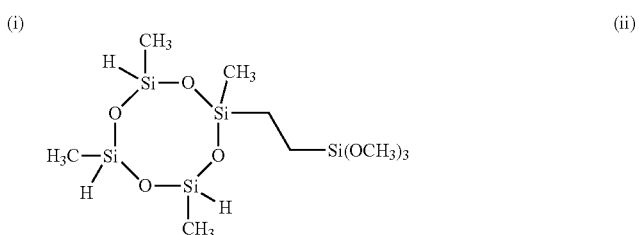

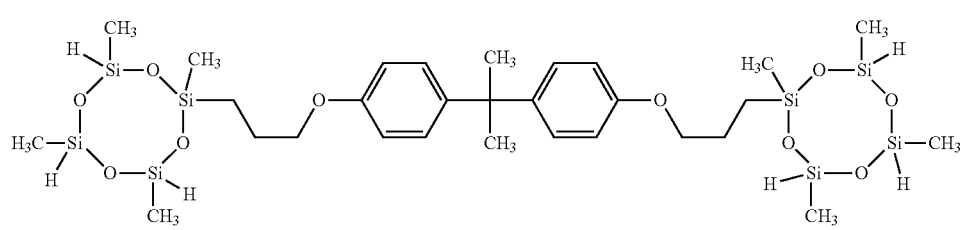

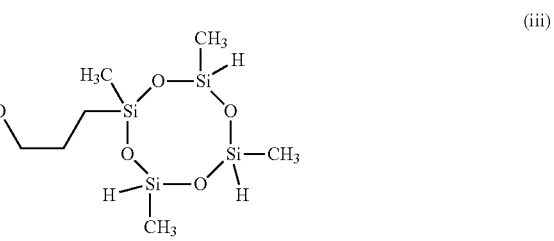

-continued
(iv)
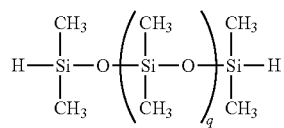
wherein q is a number such that the kinematic viscosity falls in the range of from 1 to 10,000 mm²/s.
* * * * *